(12) United States Patent
Wilson et al.

(10) Patent No.: US 7,735,385 B2
(45) Date of Patent: Jun. 15, 2010

(54) JOINT ASSEMBLY

(75) Inventors: Andrew Wilson, Allison Park, PA (US);
Andrew Punnoose, Ashburn, VA (US);
Katherine Strausser, Houston, TX
(US); Neil Parikh, North Brunswick, NJ
(US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 12/187,562

(22) Filed: Aug. 7, 2008

(65) Prior Publication Data

US 2009/0038421 A1   Feb. 12, 2009

Related U.S. Application Data

(60) Provisional application No. 60/954,908, filed on Aug. 9, 2007, provisional application No. 61/086,627, filed on Aug. 6, 2008.

(51) Int. Cl.
*F16H 29/20* (2006.01)
*B25J 17/00* (2006.01)

(52) U.S. Cl. ............... 74/89.18; 74/490.05; 901/25; 901/28

(58) Field of Classification Search ............... 74/89.18, 74/490.01, 490.03, 490.06, 490.07, 422, 74/665 K, 665 L, 665 N, 665 P, 471 XY; 180/8.1, 8.2, 8.4; 901/25, 26, 28; 403/122; 310/75 R, 83, 114; 280/5.2, 5.28; 623/24, 623/25, 57, 58, 59, 60, 61, 62, 63, 64, 65; 601/5, 23, 33, 34, 35; 248/278.1
See application file for complete search history.

(56) References Cited

U.S. PATENT DOCUMENTS 4,854,808 A * 8/1989 Bisiach .................. 414/680
6,355,999 B1 * 3/2002 Kichiji et al. ............. 310/112

* cited by examiner

*Primary Examiner*—Thomas R Hannon
*Assistant Examiner*—Phillip A Johnson
(74) *Attorney, Agent, or Firm*—Heather Goo

(57) ABSTRACT

A joint assembly is provided which includes a drive assembly and a swivel mechanism. The drive assembly features a motor operatively associated with a plurality of drive shafts for driving auxiliary elements, and a plurality of swivel shafts for pivoting the drive assembly. The swivel mechanism engages the swivel shafts and has a fixable element that may be attached to a foundation. The swivel mechanism is adapted to cooperate with the swivel shafts to pivot the drive assembly with at least two degrees of freedom relative to the foundation. The joint assembly allows for all components to remain encased in a tight, compact, and sealed package, making it ideal for space, exploratory, and commercial applications.

20 Claims, 5 Drawing Sheets

JOINT ASSEMBLY

RELATED APPLICATIONS

This application is based upon prior filed provisional patent application Ser. Nos. 61/086,627 filed Aug. 6, 2008, and 60/954,908 filed Aug. 9, 2007, the entire subject matters of which are incorporated herein by reference.

ORIGIN OF THE INVENTION

The invention described herein was made by employees under contract with the United States Government and may be manufactured and used by or for the Government for Government purposes without the payment of any royalties thereon or therefore.

FIELD OF THE INVENTION

The invention relates to a joint system and more particularly to a powered or motorized joint system capable of articulating with multiple degrees of freedom while providing multiple drive shafts for operating a wheeled leg assembly, robotic components, or other auxiliary equipment.

DESCRIPTION OF THE RELATED ART

Currently there are various methods to achieve a ball-and-socket joint using multiple motors and gear systems. The commercial applications include the medical field, aerospace, vehicular design, and many areas of robotics including but not limited to surgical, exploratory, and industrial applications.

One of the main problems of known actuated ball-and-socket joints is that their gearing fails to deliver sufficient torque for some applications. Other problems relate to or stem from the large size and high mass of the entire assembly.

It is known to provide a ball-and-socket joint actuated using multiple ultrasonic motors. These motors drive the ball by creating a traveling wave on the surface, causing the ball to rotate in the opposite direction of the wave. Three motors are arranged with axes perpendicular to each other allowing for actuation in all possible directions. Another known device is the spherical stepper motor, which uses multiple electromagnets positioned on the inner surface of a socket with multiple permanent magnets positioned on the inner surface of a ball placed inside the socket. By switching specific electromagnets on or off, the ball can be rotated to a certain position.

One of the main disadvantages to both of these known ball-and-socket joints is that neither of these designs may be geared for torque amplification and speed reduction. In addition, these known joints require large balls to accommodate the ultrasonic motors of the space permanent magnets, ultimately resulting in an extremely bulky assembly.

The need exists for a compact system that provides several degrees of freedom of movement about a single common pivot point while providing the ability for torque amplification and speed reduction where necessary.

SUMMARY OF THE INVENTION

An actuatable joint assembly of an aspect of the invention features a drive assembly and a swivel mechanism. The drive assembly comprises a motor operatively associated with a plurality of drive shafts for driving auxiliary elements, and a plurality of swivel shafts for pivoting the drive assembly. The swivel mechanism engages the plurality of swivel shafts and comprises a fixable element securable to a foundation. The swivel mechanism is adapted to cooperate with the swivel shafts to pivot the drive assembly with at least two degrees of freedom relative to the fixable element.

A second aspect of the invention provides a joint assembly featuring a drive assembly and a swivel assembly. The drive assembly comprises a motor, a plurality of drive shafts driven by the motor, a plurality of swivel shafts driven by the motor, and pinions mounted on the swivel shafts. The swivel assembly comprises at least two arc-shaped rack members that mate with the pinions mounted on the swivel shafts. The arc-shaped rack members are securable to a foundation so that rotation of the pinions causes the drive assembly to pivot about a pivot point with at least two degrees of freedom.

A third aspect of the invention provides drive assembly comprising a motor, a plurality of drive shafts concentrically arranged relative to one another and driven by the motor, and a plurality of swivel shafts. The drive shafts are operative independently of one another to selectively operate auxiliary elements. The swivel shafts are concentrically arranged relative to one another and driven by the motor for permitting pivotal movement of the drive assembly.

Certain embodiments of the actuatable joint assemblies described in the following detailed description achieve several degrees of through a single joint. For these embodiments, because all of the drive shafts may be passed through the single point, all mechanical and electrical components involved with the joint may also be located and optionally sealed inside a single enclosure.

Other aspects of the invention, including devices, apparatus, systems, and methods, will become more apparent from the following detailed description and accompanying drawings.

BRIEF DESCRIPTION OF THE DRAWINGS

The accompanying drawings are incorporated in and constitute a part of the specification. In such drawings.

DETAILED DESCRIPTION OF THE EXEMPLARY EMBODIMENTS

Figure 1:
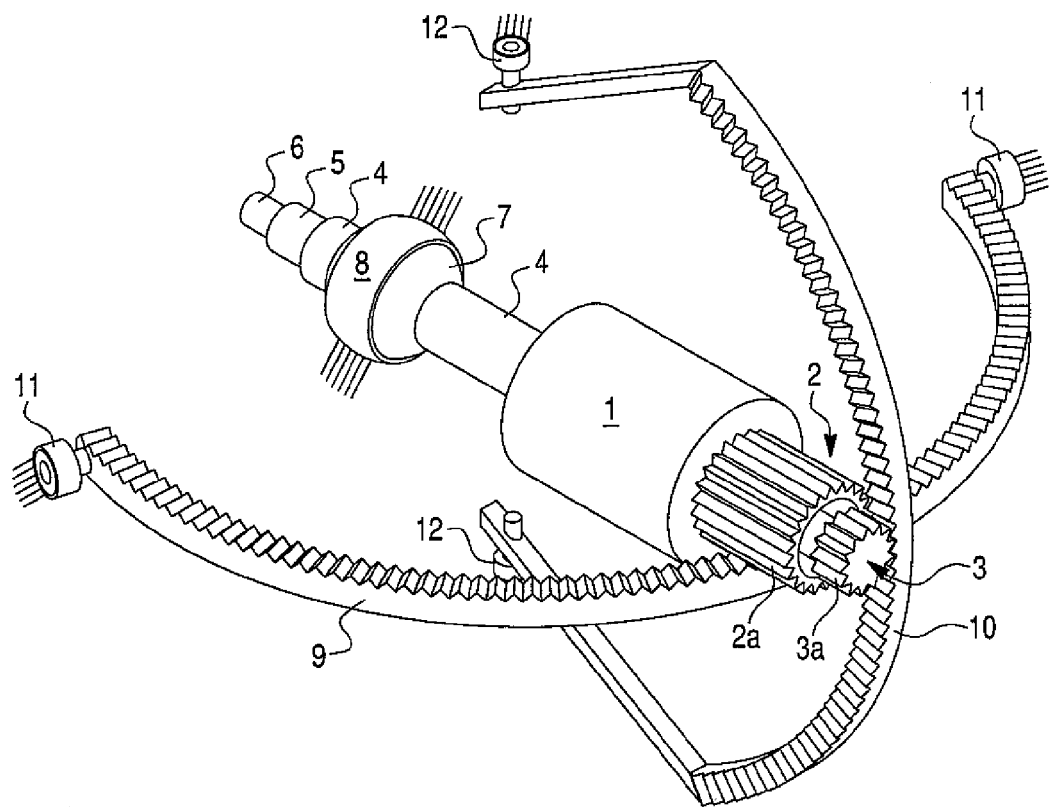
FIG. 1 illustrates the ball-and-socket assembly of the first embodiment of this invention including the motor, swivel shafts, drive shafts, and rack-and-pinion swivel components.
Figure 2:
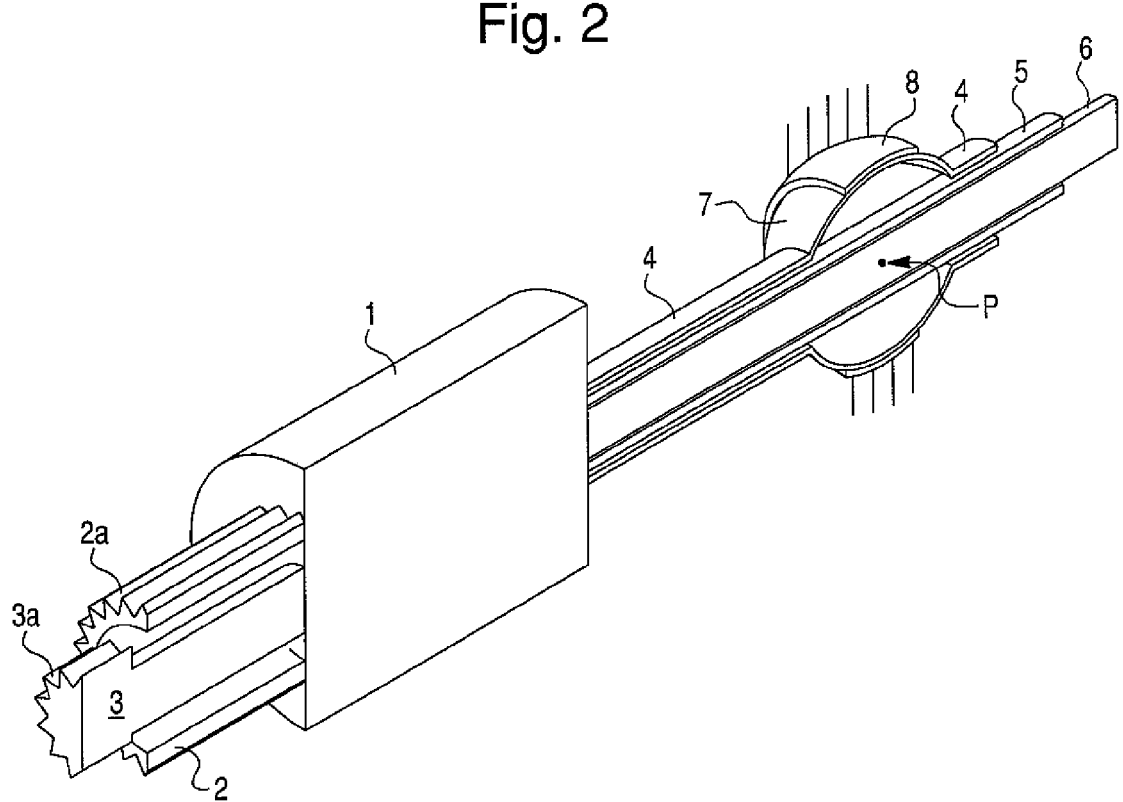
FIG. 2 is a cross-sectional view of the motor, swivel shafts and drive shafts of FIG. 1, in which a ball socket is formed about the concentric drive shafts.
Figure 2A:
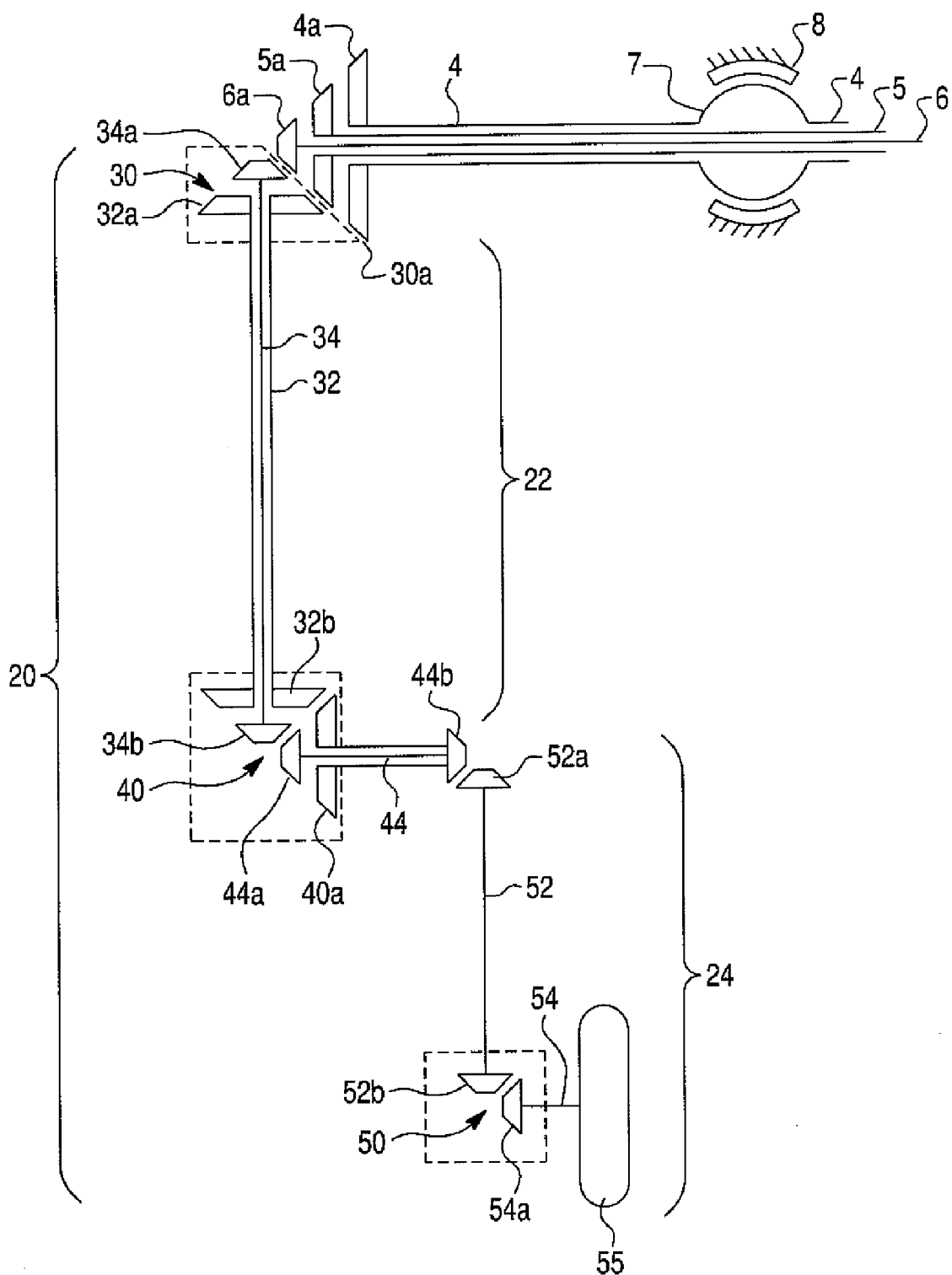
FIG. 2a is a schematic representation of an exemplary gear and shaft drive system driven and articulated by the ball-and-socket assembly of the first embodiment of this invention.

The joint assembly of a first embodiment of the present invention illustrated in FIGS. 1, 2 and 2a is designed as a ball-and-socket joint. The joint assembly features a drive assembly and a swivel mechanism (also referred to herein as a swivel assembly or structure). Generally, the drive assembly comprises a motor 1 operatively engaged with a first plurality of drive shafts 4, 5, 6 for driving auxiliary elements as will be described below, and a second plurality of swivel shafts 2, 3. The swivel mechanism is operatively engaged with the second plurality of swivel shafts 2, 3 to allow the drive assembly to pivot with at least two degrees of freedom as will be described in greater detail below. As illustrated, pivotal movement for the at least two degrees of freedom takes place about a common pivot point (or point of rotation) 'p' as follows.

Referring now to the drawings in greater detail, the ball-and-socket joint is designed around a motor 1. The motor 1 may comprise a directed flux motor. As best shown in FIG. 1, the motor 1 is central to the joint and moves with the movement of the entire drive assembly. The two rotatable swivel shafts 2, 3 of the drive assembly can be seen extending from one side of the motor 1. For the purposes of this disclosure, the side from which swivel shafts 2, 3 extend is designated the rear or posterior side of motor 1. Swivel shafts 2, 3 are concentrically arranged relative to one another, with swivel shaft 3 being disposed interiorly relative to swivel shaft 2. The swivel shafts 2, 3 each possess a pinion or gear 2a, 3a at their respective rear ends. It should be understood that the drive assembly may include additional swivel shafts. The motor 1 is designed to control rotation of shafts 2, 3 independently of one another, e.g., one of shafts 2, 3, may be rotated while the other shaft is not rotated. The motor 1 may also rotate shafts 2, 3 simultaneously at the same or different speeds.

The rotatable drive shafts 4, 5, 6 of the drive assembly extend from the opposite side of the motor 1, which is designated herein as the front or anterior side. Drive shafts 4-6 are concentrically arranged relative to one another, with drive shaft 6 being the innermost of the drive shafts, and drive shaft 4 the outermost of the drive shafts. Drive shafts 4, 5, 6 may be coaxially aligned with swivel shafts 2, 3 as illustrated. The concentric and coaxial arrangement of the shafts 2, 3, 4, 5, 6 provides a compact arrangement with enhanced durability while, at the same time, reducing the chance of debris entering the motor 1.

As shown in FIG. 2a, the drive shafts 4, 5, 6 each possesses a pinion or gear 4a, 5a, 6a, respectively, at their ends. It should be understood that the drive assembly may include fewer or additional drive shafts. Any number of shafts can cooperate with the motor 1 depending on the configuration of the motor assembly itself. The motor 1 is designed to control rotation of drive shafts 4, 5, 6 independently of one another and independently of swivel shafts 2, 3. Hence, any one, all, or less than all of shafts 2, 3, 4, 5, 6 may be rotated alone or in combination at any time at the same or different speeds.

The shafts 4, 5, 6 run concentrically through the small ball-and-socket assembly. As best shown in FIG. 2, in the illustrated embodiment the outermost drive shaft 4 forms a ball member 7 of the ball-and-socket assembly. A fixed bearing ring 8 circumscribes the ball member 7 as part of the socket of the ball-and-socket assembly. The ball-and-bearing ring assembly 7, 8 provides minimal friction for allowing ball member 7 to rotate freely in bearing ring 8 (as the motor 1 actuates the swivel shafts 2, 3 to move along rack members 9, 10, as will be described below). The bearing socket 8 maintains the stability of the drive assembly while the drive shafts 4, 5, 6 operate whatever auxiliary equipment they are engaged to.

The swivel mechanism of FIG. 1 may include at least two rack members 9, 10. The rack members 9, 10 are formed as semi-circular arcs disposed such that the center of curvature of each rack member 9, 10 is at the pivot point 'p' of the ball-and-socket joint assembly. The swivel shafts 2, 3 mesh with a rack 9 on the horizontal axis and a rack 10 on the vertical axis, respectively. The swivel mechanism also includes fixed elements in the form of pins 11, 12 or similar connectors (e.g., fasteners, hooks, etc.) situated at the opposite ends of rack members 9, 10, respectively. The pins 11, 12 secure (e.g., fix, ground, or otherwise associate) racks 9, 10 to a foundation, such as a structure, robot, leg assembly, vehicle, prosthetic, etc. Rack 9 is pivotal about pins 11 as the pinion 3a travels vertically along rack 10. The rack 10 is pivotal about pins 12 as the pinion 2a travels horizontally along rack 9. Although not shown in FIG. 1, the pinions 2a, 3a are maintained in constant contact with rack members 9, 10 by suitable means such as a mechanical track and optionally a slidable holder that maintains the pinions 2a, 3a in fixed position relative to the rack members 9, 10 while permitting the pinions 2a, 3a to "walk" or travel along the rack members 9, 10.

In operation, when motor 1 rotates the swivel shafts 2 and/or 3, the rotating pinion or pinions 2a and/or 3a will travel along the rack(s) 9 and/or 10 in a known manner, e.g., using intermeshing teeth. Rotation of the pinions 2a, 3a imparts a pivoting motion to the motor 1 and the shafts 4, 5, 6 as well as shafts 2, 3. In the illustrated embodiment, the drive shafts 4, 5, 6 and the swivel shafts 2, 3 pivot about a common pivot point 'p' that coincides with the center of the ball member 7 formed as part of the outer shaft 4 (see FIG. 2). Because the swivel shafts 2, 3, can be driven independently of one another by motor 1, the joint assembly allows for swiveling movement with two degrees of freedom. The range of freedom of the joint is limited by The drive shafts 4, 5, 6 are used to actuate other auxiliary elements (e.g., joints, wheels, mechanisms, etc.) as will be described below.

FIG. 2a shows one example of a bevel gear and shaft drive system that provides a hip joint, knee joint, and a wheeled foot. These components together define a leg for a walk and roll robot. FIG. 2a provides only one example of the utility for the ball-and-socket assembly of this invention. It should be understood that other systems and auxiliary equipment may be driven by the joint assembly of this invention, for example, a chain or belt drive system or a pinion gear system.

With reference to FIG. 2a, the drive shafts 4, 5, 6 of FIGS. 1 and 2 are shown schematically with the ball joint 7 and bearing 8. At the end of each drive shaft 4, 5, 6 are mounted respective drive gears or pinions 4a, 5a, 6a. The three drive shafts 4, 5, 6 drive the leg assembly 20 including of a hip portion or joint 30, a knee portion or joint 40, and a wheeled foot portion 50, respectively. The hip portion 30 and the knee portion 40 together define an upper section 22 of the leg assembly 20, and the knee portion 40 and wheeled foot portion 50 together define a lower section 24 of the leg assembly 20. The knee portion 40 provides a connection point for the upper and lower sections 22, 24.

Generally speaking, the leg assembly 20 and associated drive components of this illustrated embodiment are designed to function much like a human leg whereby the hip portion 30 may pivot forward and aft. Moreover, the knee portion 40 may pivot to articulate the foot portion 50 forward and aft. The wheeled foot portion 50 is design to provide a rolling motion.

More specifically, the hip portion 30 may be driven by shaft 4 and drive pinion 4a, which engages gear 30a joined to the upper leg section. Rotation of the shaft 4 and drive pinion 4a causes the entire leg assembly 20 (upper and lower sections 22, 24) in a forward and reverse direction (i.e., in and out of the papers as shown in FIG. 2a). At the same time, the drive shafts 5, 6 are arranged to drive concentric upper leg shafts 32, 34, respectively, whereby drive pinions 5a, 6a engage pinions 32a, 34a near the hip portion 30.

The knee portion 40 is driven by shaft 32 and drive pinion 32b, which engages gear 40a, to pivot the lower section 24 of the leg assembly 20 in a forward and reverse direction (i.e., in and out of the papers as shown in FIG. 2a).

The leg shaft 34 is arranged to drive lower leg shaft 52 through knee shaft 44. A drive pinion 34b at the end of leg shaft 34 engages pinion 44a and drives shaft 44. The opposite of shaft 44 includes a pinion 44b, which engages with a pinion 52a of lower leg shaft 52. The lower end of leg shaft 52 includes a pinion 52b which engages pinion 54a of axle 54. Torque is transmitted to the wheel 55 through pinion 44b, 52a and via the shaft 52 which in turn drives wheel shaft 54 via the pinions 52b and 54a.

The foregoing gear and shaft system illustrated by FIG. 2a is shown by way of example only and other means of transmission from the ball-and-socket drive assembly of FIG. 2 may be employed without departing from the spirit and scope of this invention. For example, the drive pinions 4a, 5a, 6a may drive the hip joint 30, knee joint 40 and wheeled foot 50 through a belt-drive system or other geared system (not shown).

Figure 3:
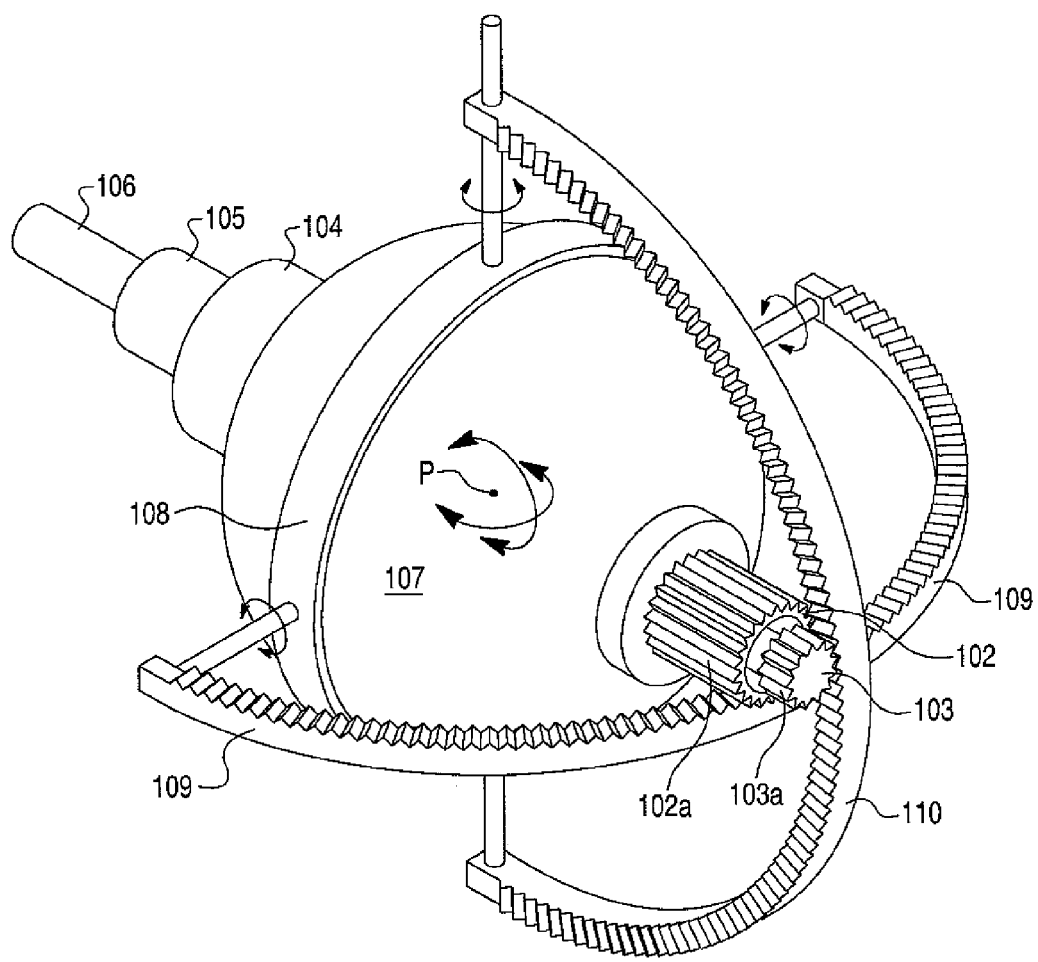
FIG. 3 illustrates an alternate embodiment of the invention whereby the ball socket circumscribes the motor for compactness.

FIG. 3 shows the alternate embodiment of the actuated ball-and-socket assembly. In the embodiment of FIG. 3, the motor (not shown) is enclosed and attached in a ball member 107 which forms the joint and pivot point when mounted in the bearing ring 108. The ball member 107 and bearing ring 108 function in much the same manner as the ball 7 and bearing 8 shown in FIGS. 1 and 2. As with the embodiment of FIGS. 1 and 2, the two swivel shafts 102, 103 exit the back of the motor 1101 and ball member 107 and rotate the pinions 102a, 103a. The pinions 102a, 103a mesh with a set of racks 109, 110 conformed to the ball member 107. The racks 109, 110 maintain a close profile to the ball member 107, thus reducing the overall size of the joint as well as providing an increased range of movement. The multiple concentric drive shafts exit the front of the motor at a single point, thus reducing the chance of debris entering the motor assembly. As above, as the motor rotates pinion 102a and/or 103a (independently of one another), the drive assembly pivots about point p.

As with the embodiment of FIGS. 1 and 2, three drive shafts 104, 105, 106 project from the ball member 107 in a direction opposite from the swivel shafts 102, 103. Drive shafts 104, 105, 106 may be operated in much the same manner as described above with respect to shafts 4-6. Shafts 102, 103, 104, 105, 106 are independently rotatable relative to one another by the motor and are provided with suitable bearing members to maintain stable and durable torque delivery.

In the embodiment of FIG. 3, the swivel mechanism fixes the rack members 109, 110 relative to the robotic body or other foundation. The fixed bearing member 108 circumscribes the ball member 107 to provide the pivot point 'p' about which the motor, the ball member 107 and the plurality of drive/swivel shafts 102, 103, 104, 105, 106 pivot. The rack members 109, 110 are formed as semi-circular arcs disposed such that the center of curvature of each rack member 109, 110 is at a point of rotation 'p' of the ball-and-socket joint assembly.

Figure 4:
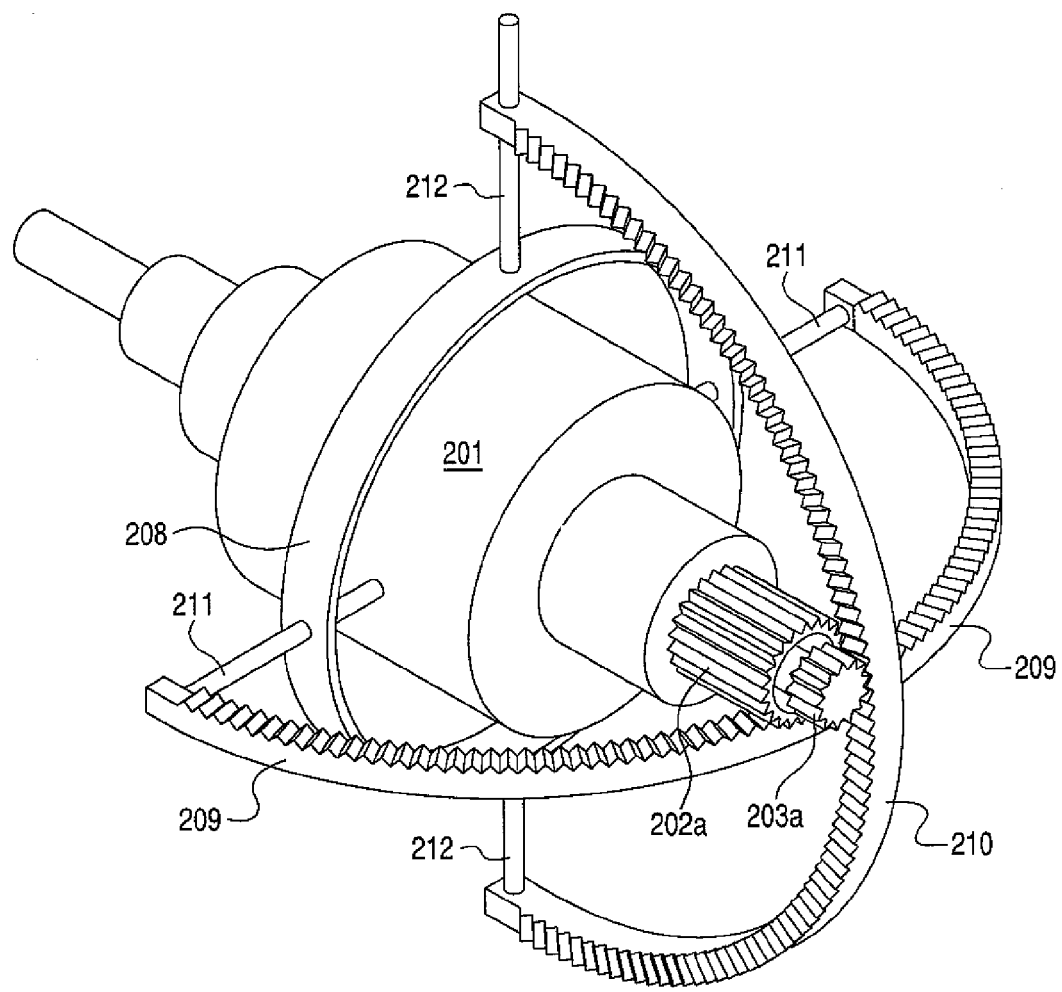
FIG. 4 illustrates a further alternative embodiment of the invention whereby the motor and drive system are mounted to a gimbal-type swivel system.

FIG. 4 shows the second alternate embodiment of the actuated ball-and-socket assembly. The passive swivel motion of the motor 201 is accomplished by pivoting it on a gimbal system as opposed to a ball as in the first alternate embodiment. A ring 208 surrounding the motor 201 supports the motor 201 on pins 211. The ring 208 is swivable in a perpendicular axis through pin support 212, which does not extend to the motor 201. Both sets of the pins 211, 212 travel through the x-y axes that support the rack systems 209, 210 along which the pinions 202a, 203a move.

The swivel action of the gimbal system is achieved by using the rack-and-pinion system on the backside of the motor 201. By driving one of the swivel shafts, the respective pinion 202a or 203a travels along one of the racks 209 or 210, moving the entire assembly along its respective axis. By driving the second swivel shaft, the pinion on that shaft travels along the second rack, moving the assembly along that second, perpendicular axis. By combining these two motions, the gimbal system may be swiveled to any of the points not limited by the roller bearing ring.

A possible alternative to the embodiment described makes the motor (rather than the outermost shaft) the ball and passes drive shafts out the front of the ball and the swivel shafts out in the back of the ball. The pinion system would work exactly as described, but would be able to be placed closer to the ball. See FIG. 3.

Another alternative to the embodiment replaces the ball of the second embodiment with a gimbal system. Using a set of pins with perpendicular axes in addition to a ring, the motor may be suspended such that it may achieve the same swivel motion of the ball. See FIG. 4.

The replacement of the gear races with a roller bearing system may reduce the mass required to support the driven loads, allowing for improved power efficiency and increased compactness. However, the specific bearing arrangement may vary depending on the size and weight requirements. The device described in FIG. 3 presents benefits over the device of FIG. 2 in that it incorporates the motor assembly into the ball of the joint, decreasing the necessary size of the racks, as they may be placed closer to the ball and therefore closer to the point of swiveling. In addition, this design, in which all drive shafts exit a single point of the motor housing, allows for the assembly to be easily sealed from the environment. In the original design of FIG. 2, in which bearing ring 8 provided the support, the concentric entry points provide a simple manner in which to seal the internal mechanisms and electronics. The improved design allows for this, permitting this joint to be used in applications that require dust mitigation, waterproof housings, etc.

While the foregoing invention has been shown and described with reference to several exemplary embodiments, it will be understood by those of skill in the art that various changes in form and detail may be made without departing from the spirit and scope of the present invention.

What is claimed is:

1. A joint assembly, comprising:
   a drive assembly comprising a motor operatively associated with a plurality of drive shafts for driving auxiliary elements, and a plurality of swivel shafts for pivoting the drive assembly; and
   a swivel assembly engaging the plurality of swivel shafts and comprising a fixable element securable to a foundation, the swivel assembly adapted to cooperate with the swivel shafts to selectively and independently pivot the drive assembly about each of at least two rotational axis and a common center point of rotation thereby providing at least two degrees of freedom relative to the fixable element about said common point of rotation.

2. The joint assembly according to claim 1, wherein at least one of the plurality of drive shafts defines a rotating body circumscribing a pivot point about which the drive assembly swivels with at least two degrees of freedom.

3. The joint assembly according to claim 1, further comprising a rotating body at least partly enclosing the drive assembly and circumscribing a pivot point about which the drive assembly swivels with at least two degrees of freedom.

4. The joint assembly according to claim 3, wherein the plurality of drive and swivel shafts project from the rotating body.

5. The joint assembly according to claim 4, wherein the plurality of drive shafts extends from the rotating body in an opposite direction from the plurality of swivel shafts.

6. The joint assembly according to claim 1, wherein the plurality of drive shafts comprises at least three front drive shafts.

7. The joint assembly according to claim 6, wherein the front drive shafts are concentrically arranged.

8. The joint assembly according to claim 1, wherein the plurality of swivel shafts comprises first and second swivel shafts concentrically arranged relative to one another.

9. The joint assembly according to claim 8, wherein the swivel assembly comprises first and second pinions rotatable with the first and second swivel shafts, respectively.

10. The joint assembly according to claim 9, further comprising first and second racks along which the first and second pinions respectively move during rotation of the swivel shafts, the racks comprising circular arcuate portions.

11. The joint assembly according to claim 10, wherein the circular arcuate portions are disposed such that the center of the curve of each of the circular arcuate portions is at a pivot point about which said pluralities of drive and swivel shafts swivel with at least two degrees of freedom.

12. The joint assembly according to claim 1, wherein the swivel assembly comprises a gimbal assembly.

13. A drive assembly comprising:
a motor;
a plurality of drive shafts concentrically arranged relative to one another and driven by the motor, the drive shafts being operative independently of one another to selectively operate auxiliary elements; and
a plurality of swivel shafts concentrically arranged relative to one another and driven by the motor for permitting swiveling movement of the drive assembly, wherein the drive assembly being configured to simultaneously pivot about each of at least two rotational axis and a common center point of rotation.

14. A joint assembly, comprising:
a drive assembly comprising a motor, a plurality of drive shafts driven by the motor, a plurality of swivel shafts driven by the motor, and pinions mounted on the swivel shafts; and
a swivel assembly comprising at least two arc-shaped rack members that mate with the pinions mounted on the swivel shafts, the arc-shaped rack members being securable to a foundation so that rotation of the pinions causes the drive assembly to pivot about at least two rotational axis and a common center point of rotation thereby providing at least two degrees of freedom of rotation about said center point of rotation.

15. The joint assembly according to claim 14, wherein the drive shafts are concentrically arranged.

16. The joint assembly according to claim 14, wherein the swivel shafts are concentrically arranged.

17. A joint assembly, comprising:
a drive assembly comprising a motor, a plurality of drive shafts driven by the motor, a plurality of swivel shafts driven by the motor, and pinions mounted on the swivel shafts; and
a swivel assembly comprising at least two arc-shaped rack members that mate with the pinions mounted on the swivel shafts, the arc-shaped rack members being securable to a foundation so that rotation of the pinions causes the drive assembly to pivot about a pivot point with at least two degrees of freedom;
wherein the drive shafts are concentrically arranged and the drive shafts comprise an outermost drive shaft comprising a ball member having a center at the pivot point, the ball member being supported by a bearing member disposed about the ball member.

18. A joint assembly, comprising:
a drive assembly comprising a motor, a plurality of drive shafts driven by the motor, a plurality of swivel shafts driven by the motor, and pinions mounted on the swivel shafts;
a swivel assembly comprising at least two arc-shaped rack members that mate with the pinions mounted on the swivel shafts, the arc-shaped rack members being securable to a foundation so that rotation of the pinions causes the drive assembly to pivot about a pivot point with at least two degrees of freedom; and
a rotating body at least partly enclosing the motor and circumscribing the pivot point.

19. A joint assembly, comprising:
a drive assembly comprising a motor, a plurality of drive shafts driven by the motor, a plurality of swivel shafts driven by the motor, and pinions mounted on the swivel shafts; and
a swivel assembly comprising at least two arc-shaped rack members that mate with the pinions mounted on the swivel shafts, the arc-shaped rack members being securable to a foundation so that rotation of the pinions causes the drive assembly to pivot about a pivot point with at least two degrees of freedom
wherein the drive shafts and said swivel shafts extend from the motor in opposite directions relative to one another.

20. A drive assembly comprising:
a motor;
a plurality of drive shafts concentrically arranged relative to one another and driven by the motor, the drive shafts being operative independently of one another to selectively operate auxiliary elements;
a plurality of swivel shafts concentrically arranged relative to one another and driven by the motor for permitting swiveling movement of the drive assembly; and
a body at least partly enclosing the motor, the plurality of drive shafts extending from one side of the body, and the plurality of swivel shafts being diametrically opposed to the drive shafts and extending from an opposite side of the body.

* * * * *